(12) United States Patent
Bilgili

(10) Patent No.: US 12,524,270 B2
(45) Date of Patent: Jan. 13, 2026

(54) COMPUTING PLATFORM FOR SIMULATING AN INDUSTRIAL SYSTEM AND METHOD OF MANAGING THE SIMULATION

(71) Applicant: Siemens Industry Software NV, Leuven (BE)

(72) Inventor: Ahmet Bilgili, Voorburg (NL)

(73) Assignee: Siemens Industry Software NV, Leuven (BE)

( * ) Notice: Subject to any disclaimer, the term of this patent is extended or adjusted under 35 U.S.C. 154(b) by 441 days.

(21) Appl. No.: 18/110,547

(22) Filed: Feb. 16, 2023

(65) Prior Publication Data

US 2023/0195521 A1    Jun. 22, 2023

Related U.S. Application Data

(63) Continuation of application No. PCT/EP2021/073441, filed on Aug. 25, 2021.

(30) Foreign Application Priority Data

Aug. 27, 2020  (EP) .................................... 20193126

(51) Int. Cl.
  *G06F 9/46* (2006.01)
  *G06F 9/50* (2006.01)
(52) U.S. Cl.
  CPC ............ *G06F 9/5016* (2013.01); *G06F 9/505* (2013.01)
(58) Field of Classification Search
  CPC .............................. G06F 9/5016; G06F 9/505
  See application file for complete search history.

(56) References Cited

U.S. PATENT DOCUMENTS

| 2013/0173894 A1 | 7/2013 | Yan et al. |
| 2015/0206277 A1 | 7/2015 | Rao et al. |
| 2019/0005606 A1 | 1/2019 | Yang |

FOREIGN PATENT DOCUMENTS

| CN | 1885988 A | 12/2006 |
| CN | 103109286 A | 5/2013 |
| JP | 2007188384 A | 7/2007 |
| JP | 2009211167 A | 9/2009 |
| WO | 2020150194 A1 | 7/2020 |

OTHER PUBLICATIONS

International Search Report and Written Opinion for International App. No. PCT/EP2021/073441 mailed Dec. 13, 2021.
Lin Wen Yu et al.:; "Implementing Dynamical Pattern Recognition Algorithem om GPU"; vol. 32; No. 1; 2013. (5 pages).

*Primary Examiner* — Gregory A Kessler
(74) *Attorney, Agent, or Firm* — Lempia Summerfield Katz LLC

(57) ABSTRACT

A computing platform for simulating an industrial system and a method of managing the simulation are disclosed. The method relates to generating at least one instance of a simulation model of the industrial system. The method includes: generating the instance using a contiguous memory allocator for a dynamic memory region associated with a first processor of the heterogenous processors; enabling a second processor to use the instance in the dynamic memory region based on a memory pointer associated with the address of a copy of the instance; and simulating the industrial system by the second processor by accessing the instance-copy.

16 Claims, 4 Drawing Sheets

COMPUTING PLATFORM FOR SIMULATING AN INDUSTRIAL SYSTEM AND METHOD OF MANAGING THE SIMULATION

The present patent document is a continuation of PCT Application Serial No. PCT/EP2021/073441, filed Aug. 25, 2021, designating the United States, which is hereby incorporated by reference, and this patent document also claims the benefit of European Patent Application No. 20193126.8, filed Aug. 27, 2020, which is also hereby incorporated by reference.

TECHNICAL FIELD

The present disclosure relates to simulating industrial systems. Particularly, the present disclosure relates to using heterogenous processors to simulate the industrial system.

BACKGROUND

When simulating an industrial system, simulation programs for simulating the state variables of the industrial system may be executed using one or more types of processors. For example, in case of autonomous vehicles, the simulation programs may be used to simulate a suitable material for the autonomous vehicle body. The simulation programs may use class instances that are libraries with properties of multiple material types. The class instances may be Central Processing Unit (CPU) centric, and therefore cannot be executed on Graphics Processing Unit (GPU).

In another example, the industrial system is a turbine. The simulation program may be used to simulate nitrogen oxide (NOx) emissions from the turbine. A C++ class may be used for reading a sensor data file including measurements from NOx sensors in the turbine. Further, the C++ class may be used to perform operations on the sensor data based on the simulation program. The sensor data may be read using a CPU. Because the size of the data is not known ahead, dynamic allocation could occur, and the sensor data may be read onto a memory location (CPU memory) accessible by the CPU. The operation may then be performed in the memory location using a function of the simulation program.

In the previous examples, if the same code needs to be used in the GPU, the class instances may need to be compiled for GPU code. However, the instance that read the data in the CPU may not be directly shared. To share the instance that read the data, explicitly copy/reconstruction of the class instances may need to be performed. Further, the dynamically allocated memory may need to be copied to GPU memory.

FIG. 1 illustrates explicit management of the CPU memory/$1^{st}$ memory 110 and the GPU memory/$2^{nd}$ memory 120 according to existing techniques. The class instance 112 is copied from the CPU memory 110 to the GPU memory 120 using the operation "copy" 132. Based on the copy operation 132, the class instance 122 is stored in the GPU memory 120. The class instance 112 may request multiple dynamic allocations such as dynamic allocation 114 and dynamic allocation 116. The dynamic allocations may need to be explicitly copy/reconstructed in the GPU memory 120. For example, the dynamic allocation 114 is copied using the copy operation 134. Accordingly, the dynamic allocation 114 is stored in the GPU memory as dynamic allocation 126.

Further, the dynamic allocation 116 is copied using the copy operation 136 and stored in the GPU memory 120 as the dynamic allocation 124.

With the increase in the number of dynamic allocations, the existing techniques may become increasingly complicated. If there are a lot of dynamic allocations, each of the dynamic allocations may need to be tracked and copied via explicit code. This may be extremely intrusive in the source code to keep track if this is a GPU or CPU code.

SUMMARY AND DESCRIPTION

Accordingly, there exists a need to improve management of simulation programs that may use heterogeneous processors. The object of the present disclosure is to provide a system and method of managing the simulation for the industrial system that uses heterogenous processors for the simulation.

For example, the object is achieved by a method of managing simulation for an industrial system using heterogenous processors. The method includes generating at least one instance of a simulation model of the industrial system. The method is characterized by generating the instance using a contiguous memory allocator for a dynamic memory region associated with a first processor of the heterogenous processors; enabling a second processor to use the instance in the dynamic memory region based on a memory pointer associated with the address of a copy of the instance; and simulating the industrial system by the second processor by accessing the instance-copy.

In another example, a computing platform for simulating an industrial system is disclosed to achieve the object. The computing platform includes heterogenous processors. The computing platform includes a first memory accessible by a first processor, a second memory allocated based on usage of the first memory on a second processor; and a memory allocation module configured to generate at least one memory pointer for at least one instance of a simulation model of the industrial system, wherein the instance is initialized by the first processor and wherein a copy of the instance is used by the second processor.

Yet another example includes a computer-program product, having machine-readable instructions stored therein, that, when executed by the computing platform disclosed herein, cause the computing platform to perform method acts disclosed herein.

The technical effect of the contiguous memory allocator, the dynamic memory region allocated, and the memory pointer is the reduction in the effort to explicitly share code between the heterogenous processors. Therefore, errors due to explicit memory management may be avoided. The present disclosure proposes techniques for implicitly managing memory used by at least one of the heterogenous processors. Particularly, providing an implicit method to share instances of a simulation model of the industrial system between the heterogenous processors. Accordingly, the present disclosure enables complicated initializations for classes (e.g., read data from disk, process data, etc.), while using the heterogenous processors. Further, the present disclosure advantageously enables to keep the same code while developing hybrid simulation programs using the heterogenous processors for execution. Furthermore, the present disclosure enables easier and effective testing of the simulation model because same simulation program is executed in different architectures. Therefore, the present disclosure may reduce the development time of the simulation models and the simulation of the industrial system.

Before describing the suggested convention in more detail, various definitions for certain words and phrases are provided throughout this disclosure, and those of ordinary skill in the art will understand that such definitions apply in many, if not most, instances to prior as well as future uses of such defined words and phrases. While some terms may include a wide variety of embodiments, the appended claims may expressly limit these terms to specific embodiments. Furthermore, features explained in the context of the suggested method may also be included by the suggested system by appropriately configuring and adapting the system and vice versa.

As used herein, "industrial system" may refer to a system/facility used for production, manufacture, and may be semi-automated or completely automated. The industrial system may be part of an automation environment, such as an industrial automation environment, power plant automation environment, autonomous vehicular automation environment, laboratory automation environment, building automation environment, or the like. Further, according to the present disclosure, the automation environment may include a combination of one or more industrial automation environments, laboratory automation environments, or building automation environments.

The industrial system may also refer to control devices, sensors, or actuators that include a physical device and a digital model that may be used to configure and control the physical device, such as Computer Numerical Control (CNC) machines, automation systems in an industrial production facility, motors, generators, or the like. The industrial system may also refer to complex systems using one or more control devices, actuators, or sensors interacting with each other. For the purpose of the present disclosure, the industrial system is any system whose operations and functions may be simulated using heterogenous processors. A person skilled in the art will appreciate that the industrial system is not limited to any particular industry as simulation applications are widely used across industries.

As used herein, "sensor data" is the data associated with the operation and operating conditions of the industrial system. The sensor data may be received from different sources (e.g., sensors, user devices, etc.). The sensors measure operating parameters associated with the system. For example, the sensors may include thermal imaging devices, vibration sensors, current and voltage sensors, etc. The term "operation parameter" refers to one or more characteristics of the system. Accordingly, the sensor data is a measure of the operating parameters associated with the operation of the system. For example, the sensor data may include datapoints representing vibration, temperature, current, magnetic flux, velocity, power associated with the industrial system such as motor, or a rotor in the industrial environment. The sensor data may be used by the simulation model to generate the at least one instance of the simulation model.

As used herein, "heterogenous processors" refers to more than one kind of processor or cores. The computing platform with the heterogenous processors are capable specialized processing capabilities in view of the heterogenous processors. In an embodiment, the computing platforms may include heterogeneous processors such as a Central Processing Unit (CPU) and a Graphics Processing Unit (GPU). For example, the heterogenous processors may include the CPU and the GPU, wherein the first processor is the CPU, and the second processor is the GPU, or vice versa.

The heterogenous processors may be used to simulate an industrial environment, particularly in case of co-simulation. In an embodiment, the instances and libraries to execute a simulation model for an industrial model may be available in a first memory associated with a first processor. When co-simulating the simulation model using a second processor, the instances are made available to the second processor using the present disclosure. Accordingly, the present disclosure addresses a situation when the simulation instances or objects are stored in different dynamic address spaces in the first memory and may be invoked by the second processor along with associated virtual functions/dynamic allocations.

In an embodiment, the industrial system is an autonomous vehicle and wherein the simulation model includes an environment model of an environment around the autonomous vehicle, a physics-based model, and a predictive model for operation parameters of the autonomous vehicle. The simulation model for the autonomous vehicle advantageously provides for initial virtual testing, which may protect manufacturers of the autonomous vehicle from potentially costly crashes and incidents out on the road. The simulation models may be configured to run instances of the environment model to enable a controller of the autonomous vehicle to react to various traffic scenarios simulated by the environment model. In an example, the traffic scenarios may be stored as libraries in the first memory associated with the first processor. When initialized, each traffic scenario may be configured to request dynamic allocations in the first memory. Further, the second processor may be used to simulate output signal (such as speed reduction) the controller of the autonomous vehicle based on the initialized traffic scenario. Accordingly, the present disclosure enables the second processor to access the initialized traffic scenarios based on the memory pointer associated with the address of a copy of the traffic scenario.

For example, the method may include generating a plurality of instances of the simulation model based on a plurality of configurations for the autonomous vehicle and a plurality of objects and object parameters in a vehicle-environment. The plurality of instances may be generated by a first simulation application. Further, the plurality of configurations and the plurality of objects and object parameters may be software libraries read by a first simulation application. The method may also include dynamically allocating the plurality of instances within the dynamic memory region and copying the dynamic memory region to the second memory accessed by a second simulation application. Furthermore, the method may include co-simulating the initialized instances by the second application and determining an optimal configuration for the autonomous vehicle based on the co-simulation. Therefore, the present disclosure advantageously enables effective use of heterogenous processors to simulate and configure an autonomous vehicle.

A person skilled in the art will appreciate that the example of autonomous vehicles is not limiting in nature. The technical effect of the present disclosure is achieved in any industrial system that is simulated using simulation models that are executed on heterogenous processors.

In another embodiment, the industrial system is a turbine in an industrial plant, wherein the simulation model includes physics-based functions and predictive functions to simulate operation of the turbine. The simulation model for the turbine is configured to simulate all aspects of the turbine including detailed structural models of turbine blades that determine stresses and strains. For example, in case of a wind turbine the simulation model may include aerodynamic model of a rotor that simulates operation of the wind turbine for wind scenarios. In the example, the wind scenarios may be generated based on historical measurements of weather conditions or through predictive functions applied on weather conditions based on machine learning models. The first processor may be configured to generate the wind scenarios and store them as libraries in the first memory. The aerodynamic model may be executed by the second processor by accessing the wind scenarios in the first memory based on the memory pointer associated with the address of a copy of the wind scenarios.

In an embodiment, the method may include generating the contiguous memory allocator to allocate the dynamic memory region within the first memory of the first processor, wherein the simulation model is stored in the dynamic memory region within the first memory. The contiguous memory allocator is configured to allocate the dynamic memory region by defining an arena/region in the first memory in which instances may be allocated individually. The dynamic memory region advantageously facilitate allocation and deallocation of memory in a flexible manner with low overhead.

The method may further include providing dynamic allocations by the contiguous memory allocator in response to requests by the instance, wherein the dynamic allocations are provided in the dynamic memory region, wherein each dynamic allocation is referred relatively by a special memory pointer instance, wherein the special memory pointer instance is configured to determine its relative distance to the dynamic allocations, and wherein the memory pointer is generated using the special memory pointer instance. Accordingly, the method provides that further allocations associated with the simulation instance will be made within the dynamic memory region. Further, the subsequent dynamic allocations are mapped easily based on relative distance from the special memory pointer instance. The relative distance is used by memory pointer to refer to the dynamic allocations, whereby the second processor may access the dynamic allocations. Therefore, the simulation model for the industrial system may be initialized with complicated initializations by the first processor without the concerns of explicit memory management between the first processor and the second processor.

In an embodiment, the method may include allocating a second memory associated with the second processor to size of the first memory based on consumption of the first memory by the simulation model stored in the dynamic memory region. The second memory is provisioned with sufficient memory to store the simulation model, simulation instances and the subsequent dynamic allocations. The method may further include copying the first memory to the second memory based on the allocation, wherein the special memory pointer instance points to dynamic allocations in the second memory and whereby the simulation model is accessible to the second processor for execution. By copying the contents of the first memory to the second memory, the dynamic memory region with the dynamic allocations and the special memory pointer instance is copied to the second memory. The copied special memory pointer is configured to generate the memory pointer that maps the dynamic allocations based on the relative distance.

The method may include initializing the instance on the first processor, wherein the instance is initialized to perform at least one function; and referencing the initialized instance by the second processor using the memory pointer and the instance-copy. Therefore, the present disclosure proposes that when a class (e.g., the simulation model) is instantiated, the instance may be copied trivially using a regular memory copy. The instance-copy may be used by the second processor using the memory pointer. Further, the method may include assigning the dynamic memory region to a first simulation application executed by the first processor, wherein the first application generates the initialized instance; and accessing the initialized instance by copying the dynamic memory region to the second memory associated with a second simulation application executed by the second processor, wherein the initialized instance is used by the second application to simulate the industrial system.

Accordingly, the method may also include simulating the industrial system by the second processor by executing the simulation model copied to the second memory. The present method is especially advantageous when developing hybrid solutions for CPU and GPU. A significant reduction in the development time may be achieved by having less errors due to explicit memory management. Further, testing the simulation model may be made easier, effective and accurate with the use of different architectures.

In an embodiment, the method may include mapping addresses in the dynamic memory region to a set of memory pointers, wherein the set of memory pointers includes the memory pointer to the address of the instance in the dynamic memory region. The method may further include generating the special memory pointer instance based on the relative distance between the address of the special memory pointer instance and the address of the instance in the dynamic memory.

In an embodiment, the method may include allocating the dynamic memory region accessible by the heterogenous processors, defining the special memory pointer for the instance with respect to the dynamic memory region; identifying whether the instance are specific to one of the first processor and the second processor and sharing the instance and instance-copy between the heterogenous processors based on the identification, wherein address of the instance in the dynamic memory region is determined using the special memory pointer. The present method advantageously provides a way to identify which functions are specific to CPU and/or GPU.

BRIEF DESCRIPTION OF THE DRAWINGS

Below, the disclosure is described using the embodiments illustrated in the figures.

DETAILED DESCRIPTION

Figure 1:
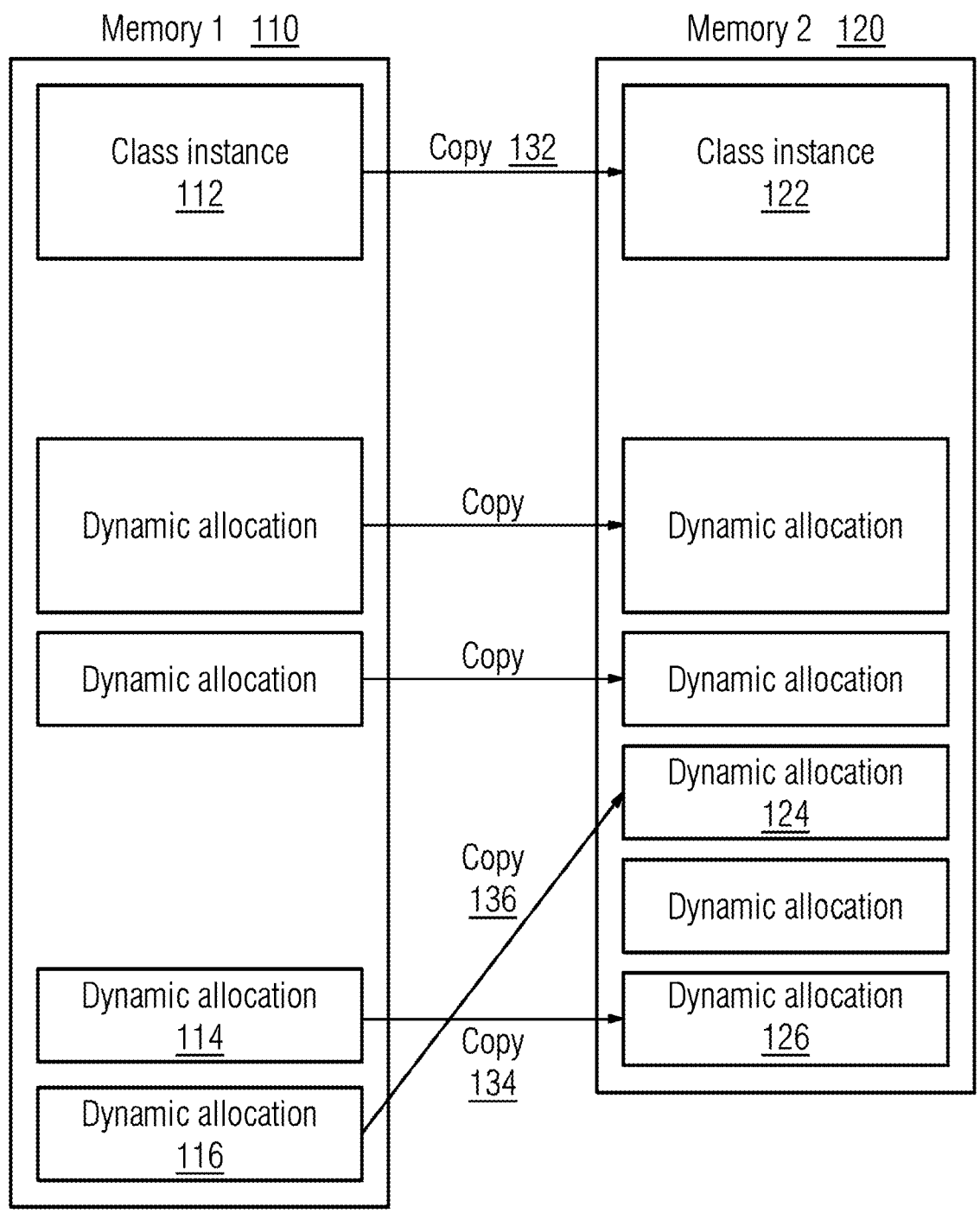
FIG. 1 illustrates explicit management between heterogenous processors according to prior art.

Hereinafter, embodiments for carrying out the present disclosure are described in detail. The various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Figure 2:
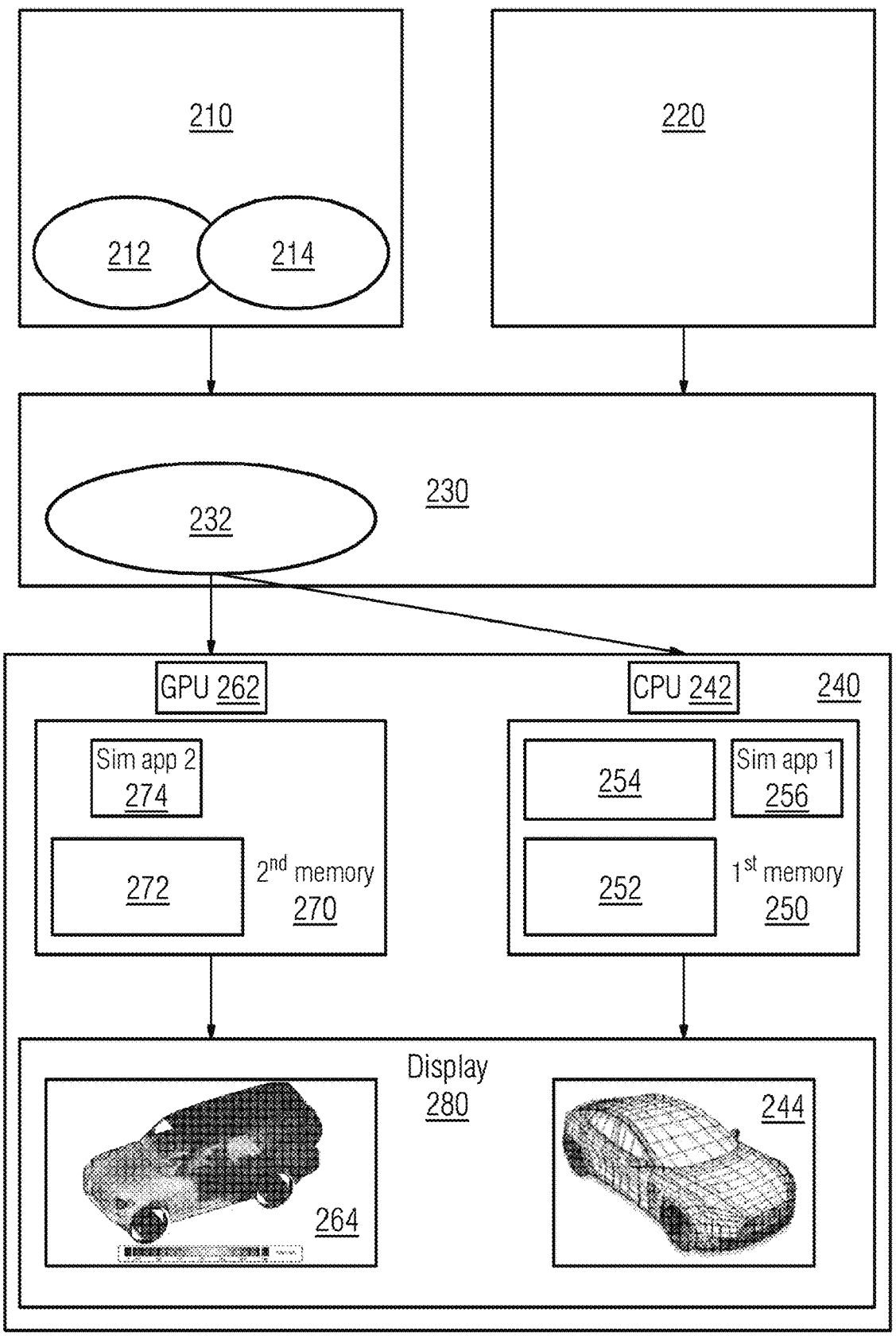
FIG. 2 illustrates a block diagram of a computing platform for simulating an industrial system, according to an embodiment.

FIG. 2 illustrates a block diagram of a computing platform 200 for simulating one or more autonomous vehicles using heterogenous processors 242, 262, according to an embodiment.

The computing platform 200 includes an environment module 210 configured to generate an environment model reflecting the environment around the autonomous vehicles. The environmental model is generated from the sensor data 212 and 214. The sensor data 212 includes sensor values that indicate accelerations, decelerations, wheel slip angles, and vehicle roll of the autonomous vehicles. Further, the sensor data 214 includes Lidar, Camera, and Radar sensor data. The simulation of the autonomous vehicles may be performed by generating the environment model through reconstruction of sensor data 212 and 214. Accordingly, the environment model acts as a digital representation of the autonomous vehicles and the associated environment.

The computing platform 200 also includes a scenario database 220. Simulation of the autonomous vehicles is performed for multiple scenarios illustrating one or more traffic conditions. It may be necessary for controllers of the autonomous vehicles to recognize and react to a number of complex scenarios. The scenarios are stored in the scenario database 220.

The computing platform 200 includes a simulation module 230 configured to generate the simulation model. The simulation model is a physics-based model of the autonomous vehicles and the environment model. The simulation model may include multiple behavior instances of the autonomous vehicle. The simulation module 230 includes an instance generator 232 to generate simulation instances. The simulation instances are generated from the simulation model and are executable by the heterogenous processors 242, 262. The simulation instances may be generated as objects created from the simulation module. The simulation module acts as a class from which the objects, e.g., the simulation instances are created.

The computing platform 200 includes computing unit 240 including the heterogenous processors 242 and 262. In FIG. 2, the heterogenous processors are CPU 242 and GPU 262. The computing unit 240 further includes a first memory 250 associated with the CPU 242 and a second memory 270 associated with the GPU 262. The computing unit 240 further includes a display 280 configured to display Graphical User Interfaces (GUI) 244 and 264. In an embodiment, the computing unit 240 may include the simulation module 230, the scenario database 220 and the environment module 210.

The CPU 242 and the GPU 262 execute simulation applications 256 and 274 stored in the memory 250 and 270, respectively, to simulate behavior of the autonomous vehicles. The results of the simulation are displayed on the display 280 via the GUIs 244 and 264, respectively.

The first memory 250 includes a dynamic memory region 252 and a memory allocator module 254. In operation, the memory allocator module 254 is configured to generate a contiguous memory allocator that allocates the dynamic memory region 252. Further, the memory allocator module 254 is configured to generate a memory pointer used by the GPU 262 using a special memory pointer instance. The details of the operation are provided in FIG. 3.

The contiguous memory allocator may be used to instantiate the simulation instances. When instantiated, the simulation instance may generate unique representations of the simulation model. Further, dynamic allocations requested by the simulation instance are provided by the contiguous memory allocator within the dynamic memory region. The second memory 270 includes a copy of the dynamic memory region 272. The GPU 262 may access instantiated simulation instances in the dynamic memory region 252 via an instance-copy stored in the dynamic memory region 272. The dynamic memory region 252 includes a special memory pointer instance that refers the instantiated instances based on their relative distance with itself. Operation of the computing unit 240 is explained in FIG. 3.

Figure 3:
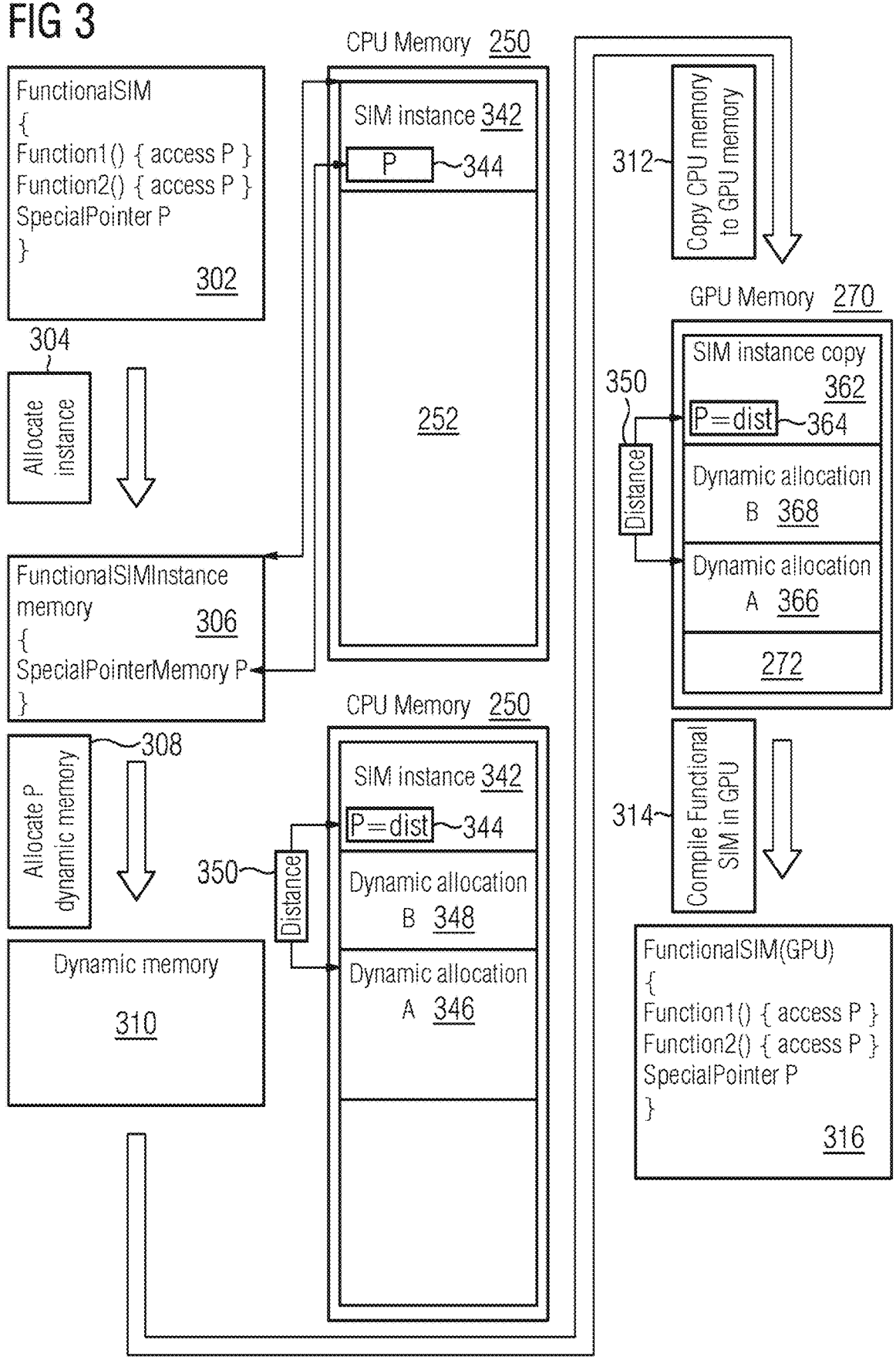
FIG. 3 illustrates a flow diagram of a method of managing simulations for an industrial system using heterogenous processors, according to an embodiment.

FIG. 3 illustrates a flow diagram of a method of managing simulations for autonomous vehicles using heterogenous processors 242 and 262, according to an embodiment.

At act 302, the computing unit 240 receives a description of the simulation model with Function 1, Function 2, and special pointer P. The Function 1 and Function 2 are based on the simulation operation performed using the simulation applications 256 and 274.

At act 304, the contiguous memory allocator allocates an instance memory for a simulation instance of the simulation model.

At act 306, the simulation instance 342 and a special memory pointer instance 344 is created in the CPU memory 250 within the dynamic memory region 252. The simulation instance 342 includes a special memory pointer instance 344.

At act 308, dynamic memory is allocated for the special memory pointer instance 344.

At act 310, dynamic allocations by the contiguous memory allocator is in response to requests by the simulation instance 342. The dynamic allocations 346 and 348 are provided in the dynamic memory region. As shown, the dynamic allocation A 346 and the dynamic allocation B 348 may be provided randomly. In the prior art, referencing the dynamic allocations 346 and 348 was challenging (as shown in FIG. 1). Each dynamic allocation 346 and 348 is referred relatively by the special memory pointer instance 344 based on its relative distance 350 to the dynamic allocations 346 and 348.

At act 312, the CPU memory 250 is copied to the GPU memory 270. Accordingly, an instance copy 362 of the simulation instance 342 and a pointer copy 364 of the special memory pointer instance 344 is created in a copy of dynamic memory 272. The dynamic allocations 346 and 348 are also copied to dynamic allocations 366 and 368. The pointer copy 364 may be different from the special memory pointer instance 344. Nevertheless, the pointer copy 364 is configured to reference the dynamic allocations 366 and 368 based on the relative distance 350.

At act 314, the simulation model is compiled using the GPU 262.

Further, at act 316, the GPU 262 may access the dynamic allocations 366 and 368 using the pointer copy 364. The pointer copy 364 is able to locate the dynamic allocations 366 and 368 based on the relative distance 350. Accordingly, the present disclosure overcomes the challenges of explicitly managing memory between the CPU 242 and the GPU 262.

In an example, the simulation application 256 may be related to simulating materials used in an autonomous sedan vehicle. Simulating the materials enables determination of strength, stiffness and crash response of the autonomous sedan vehicle. For the simulation, the simulation application 256 may initialize C++ libraries associated material properties that may be read only by the CPU 242. Example material properties include wavelength, elasticity, flame retardancy, electric, and thermal conductivity, etc. The simulation application 274 may be related to simulating damage and fatigue of an autonomous hatchback vehicle. The material libraries initialized by the simulation application 256 is accessed by the application 274 based on the aforementioned method.

Figure 4:
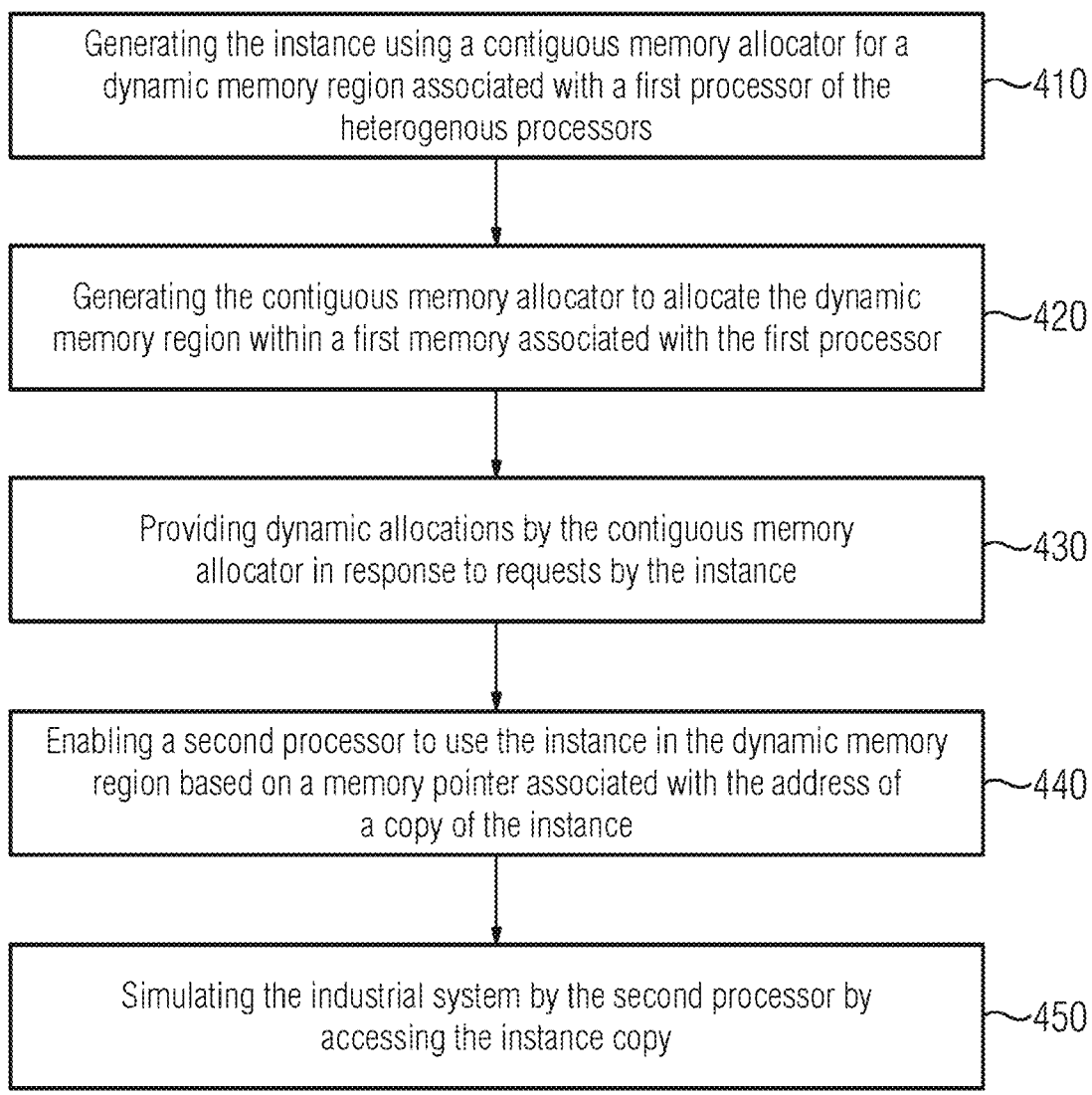
FIG. 4 illustrates method acts of a method of managing simulations for an industrial system using heterogenous processors, according to an embodiment.

A person skilled in the art will appreciate that the example of the autonomous vehicle may be expanded to any industrial system that is simulated using heterogenous processors. FIG. 4 illustrates method acts of a method of managing simulations for an industrial system using heterogenous processors, according to an embodiment.

The method includes generating at least one instance of a simulation model of the industrial system. The simulation model is a physics-based model of the industrial system and a predictive model that is based on machine learning. The simulation model may simulate multiple behavior instances of the industrial system based on the physics-based model and the predictive model. The simulation instances are generated from the simulation model and are executable by the heterogenous processors and is therefore also referred to as hybrid simulation model. The simulation instances may be generated as objects created from the simulation module. The simulation module acts as a class from which the objects, e.g., the simulation instances are created.

As used herein, "physics-based model" may include system identification, a related assembly associated with the industrial system, operating conditions associated with the industrial system, the system parameters and the relationship between the system parameters and the predicted performance indicators. For example, the physics-based model includes one-dimensional (1D) representation, three-dimensional (3D) representation, or process and instrumentation representation associated with the industrial system. The physics-based model may further include dynamics of the industrial system, representation of mechanical functions with electronics and controls, materials and manufacturing methods. Further, the physics-based model may be simulated to predict the behaviors of the industrial system.

As used herein, "predictive model" includes data-based model of the industrial system. For example, the predictive model is generated by analyzing at least one of the sensor data, historical operation data and synthesized data associated with the industrial system using one or more machine learning algorithms such as pattern recognition algorithms. The sensor data may be analyzed in real-time using the machine learning algorithms. Further, the historical operation data refers to the sensor data of a lapsed time instant. Furthermore, the synthesized data includes data that is generated based on the sensor data or the historical operation data using statistical predictive algorithms.

At act 410, at least one simulation instance (referred herein after as instance) is created using a contiguous memory allocator for a dynamic memory region associated with a first processor of the heterogenous processors, for example, as illustrated in act 306.

The contiguous memory allocator is generated by the first processor to allocate the dynamic memory region in a first memory associated with the first processor. Accordingly, at act 420, the contiguous memory allocator is generated to allocate the dynamic memory region.

The instance created in the dynamic memory region may request dynamic allocations. Accordingly, at act 430, dynamic allocations are provided within the dynamic memory region. Therefore, memory is allocated for the instance for additional functions that may be initialized when the instance is instantiated. Act 430 also includes referring the dynamic allocations relatively by a special memory pointer instance. The special memory pointer instance is configured to determine its relative distance to the dynamic allocations, for example, as illustrated in act 310.

At act 440, a second processor of the heterogenous processors is enabled to use the instance based on a memory pointer associated with the address of a copy of the instance. The memory pointer determines the address of the instance-copy using the special memory pointer instance. In an embodiment, the instance-copy is made by allocating a second memory associated with the second processor to size of the first memory based on consumption of the first memory by the instance created in the dynamic memory region. Further, the instance-copy is made copying the first memory to the second memory based on the allocation, wherein the special memory pointer points to the instance-copy in the second memory and whereby the instance is accessible to the second processor for execution, for example, as illustrated in acts 312 and 316.

At act 450, the industrial system is simulated by the second processor by accessing the instance in the dynamic memory region. For example, the simulation model is compiled using the second processor using the instance-copy. In an embodiment, act 450 may include referring the instance-copy by a simulation application executed by the second processor using the special memory pointer instance.

The present disclosure may take a form of a computer program product including program modules accessible from computer-usable or computer-program product/computer-readable medium storing program code for use by or in connection with one or more computers, processors, or instruction execution system. For the purpose of this description, a computer-usable or computer-readable medium may be any apparatus that may contain, store, communicate, propagate, or transport the program for use by or in connection with the instruction execution system, apparatus, or device. The medium may be electronic, magnetic, optical, electromagnetic, infrared, or semiconductor system (or apparatus or de-vice) or a propagation mediums in and of themselves as signal carriers are not included in the definition of physical computer-readable medium include a semiconductor or solid state memory, magnetic tape, a removable computer diskette, random access memory (RAM), a read only memory (ROM), a rigid magnetic disk and optical disk such as compact disk read-only memory (CD-ROM), compact disk read/write, and DVD. Both processors and program code for implementing each aspect of the technology may be centralized or distributed (or a combination thereof) as known to those skilled in the art.

While the present disclosure has been described in detail with reference to certain embodiments, the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope. All advantageous embodiments claimed in method claims may also be applied to system/apparatus/device claims.

The invention claimed is:
1. A method of managing simulation for an industrial system using heterogenous processors, the method comprising:

generating a contiguous memory allocator to allocate a dynamic memory region within a first memory associated with a first processor from the heterogenous processors, wherein a simulation model is stored in the dynamic memory region within the first memory;

generating an instance of the simulation model of the industrial system using the contiguous memory allocator for the dynamic memory region associated with the first processor of the heterogenous processors, wherein the generating of the instance comprises providing dynamic allocations by the contiguous memory allocator in response to requests by the instance, and wherein the dynamic allocations are provided in the dynamic memory region;

enabling a second processor of the heterogenous processors to use the instance in the dynamic memory region based on a memory pointer associated with an address of a copy of the instance; and allocating a second memory associated with the second processor to size of the first memory based on consumption of the first memory by the simulation model stored in the dynamic memory region;

copying the first memory to the second memory based on the allocation, wherein a special memory pointer instance points the dynamic allocations in the second memory, and wherein the simulation model is accessible to the second processor for execution; and simulating the industrial system by the second processor by executing the simulation model copied to the second memory, wherein the dynamic allocations are referred relatively by the special memory pointer instance, wherein the special memory pointer instance is configured to determine a relative distance of the special memory pointer instance to the dynamic allocations, and wherein the memory pointer is generated using the special memory pointer instance.

2. The method of claim 1, further comprising:
allocating the dynamic memory region accessible by the heterogenous processors;
creating the special memory pointer instance for the instance with respect to the dynamic memory region; and
sharing the instance and the copy of the instance between the heterogenous processors, wherein an address of the instance in the dynamic memory region is determined using the special memory pointer instance.

3. The method of claim 2, further comprising:
initializing the instance on the first processor, wherein the instance is initialized to perform at least one function; and
referencing the initialized instance by the second processor using the memory pointer and the copy of the instance.

4. The method of claim 3, further comprising:
assigning the dynamic memory region to a first simulation application executed by the first processor, wherein the first simulation application generates the initialized instance; and
accessing the initialized instance by copying the dynamic memory region to the second memory associated with a second simulation application executed by the second processor,
wherein the initialized instance is used by the second simulation application to simulate the industrial system.

5. The method of claim 4, wherein the heterogenous processors comprise at least of a Central Processing Unit (CPU) and a Graphics Processing Unit (GPU), and
wherein the first processor is the CPU and the second processor is the GPU, or wherein the first processor is the GPU and the second processor is the CPU.

6. The method of claim 5, wherein the industrial system is an autonomous vehicle, and
wherein the simulation model comprises an environmental model of an environment around the autonomous vehicle, a physics-based model, and a predictive model for operation parameters of the autonomous vehicle.

7. The method of claim 6, further comprising:
generating a plurality of instances of the simulation model based on a plurality of configurations for the autonomous vehicle and a plurality of objects and object parameters in a vehicle-environment, wherein the plurality of instances is generated by the first simulation application, wherein the plurality of configurations and the plurality of objects and the object parameters are software libraries read by the first simulation application;
dynamically allocating the plurality of instances within the dynamic memory region;
copying the dynamic memory region to the second memory accessed by the second simulation application;
co-simulating the plurality of instances by the second simulation application; and
determining an optimal configuration for the autonomous vehicle based on the co-simulation.

8. The method of claim 1, further comprising:
initializing the instance on the first processor, wherein the instance is initialized to perform at least one function; and
referencing the initialized instance by the second processor using the memory pointer and the copy of the instance.

9. The method of claim 1, further comprising:
assigning the dynamic memory region to a first simulation application executed by the first processor, wherein the first simulation application generates an initialized instance; and
accessing the initialized instance by copying the dynamic memory region to the second memory associated with a second simulation application executed by the second processor,
wherein the initialized instance is used by the second simulation application to simulate the industrial system.

10. The method of claim 1, wherein the heterogenous processors comprise at least of a Central Processing Unit (CPU) and a Graphics Processing Unit (GPU), and
wherein the first processor is the CPU and the second processor is the GPU, or wherein the first processor is the GPU and the second processor is the CPU.

11. The method of claim 1, wherein the industrial system is an autonomous vehicle, and
wherein the simulation model comprises an environmental model of an environment around the autonomous vehicle, a physics-based model, and a predictive model for operation parameters of the autonomous vehicle.

12. The method of claim 11, further comprising:
generating a plurality of instances of the simulation model based on a plurality of configurations for the autonomous vehicle and a plurality of objects and object parameters in a vehicle-environment, wherein the plurality of instances is generated by a first application, wherein the plurality of configurations and the plurality of objects and the object parameters are software libraries read by the first application;
dynamically allocating the plurality of instances within the dynamic memory region;
copying the dynamic memory region to the second memory accessed by a second application;
co-simulating the plurality of instances by the second application; and
determining an optimal configuration for the autonomous vehicle based on the co-simulation.

13. The method of claim 1, wherein the industrial system is a turbine in an industrial plant, and
wherein the simulation model comprises physics-based functions and predictive functions to simulate operation of the turbine.

14. A computing platform for simulating an industrial system, the computing platform comprising:
two or more heterogenous processors comprising a first processor and a second processor;
a first memory associated with the first processor and a second memory associated with the second processor; and
a memory allocation module, the memory allocation module configured to:
generate a contiguous memory allocator to allocate a dynamic memory region within the first memory, wherein a simulation model is stored in the dynamic memory region within the first memory, wherein the contiguous memory allocator is for providing dynamic allocations in response to requests by an instance of the simulation model, and wherein the dynamic allocations are provided in the dynamic memory region;
enable the second processor of the heterogenous processors to use the instance in the dynamic memory region based on a memory pointer associated with an address of a copy of the instance;
allocate the second memory associated with the second processor to size of the first memory based on consumption of the first memory by the simulation model stored in the dynamic memory region; and
copy the first memory to the second memory based on the allocation, wherein a special memory pointer instance points the dynamic allocations in the second memory, and wherein the simulation model is accessible to the second processor for execution,
wherein the dynamic allocations are referred relatively by the special memory pointer instance,
wherein the special memory pointer instance is configured to determine a relative distance of the special memory pointer instance to the dynamic allocations,
wherein the memory pointer is generated using the special memory pointer instance, and
wherein the second processor is capable of simulating the industrial system by the second processor by executing the simulation model copied to the second memory.

15. The computing platform of claim 14, wherein the heterogenous processors comprise a Central Processing Unit (CPU) and a Graphics Processing Unit (GPU), and
wherein the first processor is the CPU and the second processor is the GPU, or wherein the first processor is the GPU and the second processor is the CPU.

16. A non-transitory computer-program product, having machine-readable instructions stored therein, that when executed by a computing platform comprising two or more heterogenous processors comprising a first processor and a second processor, a first memory associated with the first processor and a second memory associated with the second processor, and a memory allocation module, cause the computing platform to:
generate a contiguous memory allocator to allocate a dynamic memory region within the first memory associated with the first processor from the heterogenous processors, wherein a simulation model is stored in the dynamic memory region within the first memory;
generate an instance of the simulation model of an industrial system using the contiguous memory allocator for the dynamic memory region associated with the first processor of the heterogenous processors, wherein the generation of the instance comprises providing dynamic allocations by the contiguous memory allocator in response to requests by the instance, and wherein the dynamic allocations are provided in the dynamic memory region;
enable the second processor of the heterogenous processors to use the instance in the dynamic memory region based on a memory pointer associated with an address of a copy of the instance; and
allocate the second memory associated with the second processor to size of the first memory based on consumption of the first memory by the simulation model stored in the dynamic memory region;
copy the first memory to the second memory based on the allocation, wherein a special memory pointer instance points the dynamic allocations in the second memory, and wherein the simulation model is accessible to the second processor for execution; and
simulate the industrial system by the second processor by executing the simulation model copied to the second memory,
wherein the dynamic allocations are referred relatively by the special memory pointer instance,
wherein the special memory pointer instance is configured to determine a relative distance of the special memory pointer instance to the dynamic allocations, and
wherein the memory pointer is generated using the special memory pointer instance.

* * * * *